US008447910B1

(12) United States Patent
Yi et al.

(10) Patent No.: US 8,447,910 B1
(45) Date of Patent: May 21, 2013

(54) SYSTEMS AND METHODS FOR IMPLEMENTING BLUETOOTH OVER A VIRTUAL USB CONNECTION

(75) Inventors: Seung Baek Yi, San Diego, CA (US); David Edward McCracken, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 12/956,568

(22) Filed: Nov. 30, 2010

(51) Int. Cl.
*G06F 13/00* (2006.01)
(52) U.S. Cl.
USPC .......................................... 710/315; 455/41.2
(58) Field of Classification Search
USPC .......................................... 710/315; 455/41.2
See application file for complete search history.

(56) References Cited

U.S. PATENT DOCUMENTS

| | | | |
|---|---|---|---|
| 6,775,733 B2* | 8/2004 | Chang et al. | 710/313 |
| 2003/0086388 A1* | 5/2003 | Peters et al. | 370/328 |
| 2005/0215197 A1* | 9/2005 | Chen et al. | 455/41.2 |
| 2006/0068760 A1* | 3/2006 | Hameed et al. | 455/412.1 |
| 2007/0028018 A1* | 2/2007 | Giroud et al. | 710/62 |
| 2007/0255884 A1* | 11/2007 | Kinstler | 710/315 |

\* cited by examiner

*Primary Examiner* — Glenn A Auve
(74) *Attorney, Agent, or Firm* — Bay Area Technology Law Group PC

(57) ABSTRACT

This disclosure involves methods and systems for providing a host with a Bluetooth transceiver by way of a virtual USB connection to a PCI/PCIe bus in which the virtual USB connection is controlled by a modified OHCI. The Bluetooth transceiver is configured to send a status signal when there is data to be transferred to the host. The modified OHCI is configured to activate a list processor upon receipt of the status signal, such that the list processor controls the transfer of the data to be transferred to the host. After delivery of the data to the host, the modified OHCI is configured to inactivate the list processor. Further, the modified OHCI is configured to be compatible with standard USB software resident on the host.

24 Claims, 1 Drawing Sheet

SYSTEMS AND METHODS FOR IMPLEMENTING BLUETOOTH OVER A VIRTUAL USB CONNECTION

FIELD OF THE PRESENT INVENTION

The present disclosure generally relates to integrated Bluetooth and WLAN communication devices and more particularly to a single chip delivering the combined functionality over a single interface bus.

BACKGROUND OF THE INVENTION

There is a growing need to provide computing devices with wide variety of communication media, particularly using wireless technologies. For example, personal computers, netbooks, laptops, smartphones, PDAs, MIDs and the like often benefit from having wireless local area network (WLAN) and BLUETOOTH® ("Bluetooth," managed by the Bluetooth Special Interest Group) functionality. As discussed below, there are a number of factors that help facilitate the provision of these services to the computing device.

A major consideration is to ensure compatibility with existing Bluetooth implementations. For example, MICROSOFT® ("Microsoft," Redmond, Wash.) WINDOWS® ("Windows") supports Bluetooth functionality through a protocol known as a stack. The Windows Bluetooth stack only operates through a universal serial bus (USB) interface. Similarly, Windows software drivers require the use of this stack, and correspondingly, only function when Bluetooth is implemented over USB. The ubiquity of Windows-based computers has ensured that this method of supporting Bluetooth has been widely adopted, essentially becoming a de facto standard. Indeed, other operating systems, such as Linux, will often mimic the Windows protocols to improve compatibility. Correspondingly, compatibility with the Windows Bluetooth stack is a great practical advantage, allowing the use of a significant amount of prewritten software code.

Given the above motivations to utilize the Windows Bluetooth stack, conventional approaches to provide a device with WLAN and Bluetooth communication generally employ a USB interface to the Bluetooth hardware. One such implementation is shown in FIG. 1 which schematically depicts computing device 100 and its relevant functional components, including central processing unit (CPU) 102, the WLAN module 104 and the Bluetooth module 106. Following standard microprocessor architecture, CPU 100 is connected to the main memory 108 through front side bus 110 and the main interface between the majority of the mainboard components is a Peripheral Component Interconnect (PCI) bus or, more preferably, a Peripheral Component Interconnect Express (PCIe) bus 112. To facilitate the design of such computing devices, it will be appreciated that it is desirable to utilize the bus 112 to interface with WLAN module 104 and Bluetooth module 106. However, since the Windows Bluetooth stack does not support the direct connection of a Bluetooth module via a PCI/PCIe bus, Bluetooth module 106 is physically connected 114 to one of the USB ports 116 and 118 provided by southbridge controller 120. To implement the USB ports, southbridge controller 120 has a standard USB open host controller interface (OHCI) 122 that is compatible with the Windows Bluetooth stack and governs the operation of USB ports 116 and 118, allowing the use of a Bluetooth module adhering to the USB standards, or the connection of any other USB device.

As will be discussed more fully below, OHCI 122 is responsible for communicating with CPU 102 to manage data transfer between host computing device 100 and the USB device connected to USB port 116 or 118. Briefly, OHCI 122 employs a list processor 124 that communicates with host controller communications area (HCCA) 126, a shared location in main memory 108. Relevant USB data in main memory 108 is organized in an endpoint structure to which list processor 124 can refer to chive the transfer of data to and from host computing device 100.

The implementation shown in FIG. 1 achieves the goals of allowing the use of the Windows Bluetooth stack to enable the Bluetooth module and employs a common bus to connect the Bluetooth and WLAN modules. However, the use of a USB port is associated with notable drawbacks.

The success of the USB interface has led to a proliferation of USB devices, including keyboards, mice, speakers, cameras, and the like, all of which consume a USB port, the number of which are necessarily limited. Given the demand for USB ports presented by these peripherals, it would be desirable to avoid the use of one of the ports to provide Bluetooth communication.

Further, the need to provide a physical USB connection in the system of FIG. 1 prevents the WLAN and Bluetooth modules from being integrated onto a single chip. This in turn adds to the size and cost of the device and foregoes the resource conservation represented by a single chip solution.

Finally, the USB interface has a polling architecture. As such, OHCI 122 must continually signal the USB device with handshake packets to find out if the USB device has data to transfer. In many instances, for example, with regard to human interface devices (HIDs), the device will not have any data to transfer for significant periods of time, resulting in a negative acknowledgement. The power consumed during this condition does not result in any data transfer. Accordingly, a USB-connected Bluetooth module does not represent a very power efficient design, which can be undesirable, particularly with regard to mobile applications.

Accordingly, it would be desirable to provide a computing device with wireless communication in the form of WLAN and Bluetooth while employing a single bus interface. It would also be desirable to provide the WLAN and Bluetooth functionality without requiring the use of a physical USB port. Further, it would be desirable to provide the wireless communication while improving power efficiency. In addition, it would be desirable to provide a Bluetooth system that is compatible with existing USB standards and protocols, including the Microsoft Windows Bluetooth stack. This invention satisfies these and other needs.

SUMMARY OF THE INVENTION

In accordance with the above objects and those that will be mentioned and will become apparent below, this disclosure is directed to a method for providing a host with Bluetooth communications capabilities, comprising the steps of providing a host with a Bluetooth transceiver, a modified OHCI controlling a virtual USB connection to the Bluetooth transceiver and a Peripheral Component Interconnect®/Peripheral Component Interconnect Express® ("PCI/PCIe," managed by the PCI Special Interest Group) bus, wherein the Bluetooth transceiver is connected by the modified OHCI to the PCI/PCIe bus and wherein the modified OHCI has a list processor, sending a status signal from the Bluetooth transceiver to the modified OHCI when there is data to be transferred to the host, activating the list processor when the modified OHCI receives the status signal from the Bluetooth transceiver, transferring the data to be delivered to the host using the list processor, and inactivating the list processor when the data has been delivered to the host.

Preferably, the modified OHCI is backward compatible with existing operating system software and USB drivers, including standard USB software resident on the host, a Microsoft Windows Bluetooth stack or the USB 1.1 protocol.

In one aspect, the method also includes the step of providing WLAN communications with a WLAN transceiver connected to the PCI/PCIe bus. Preferably, the step of providing a host further comprises providing a host with a WLAN transceiver and the Bluetooth transceiver integrated onto the same chip.

In another aspect, the step of transferring data comprises transferring bulk IN data. Preferably, this also includes transferring interrupt IN data.

In yet another aspect, the host comprises a CPU and main memory and the method also includes the step of the modified OHCI not interacting with the CPU and the main memory regarding bulk and interrupt IN transfers until the Bluetooth transceiver sends the status signal.

Also preferably, the methods of the disclosure include a further step of the modified OHCI advertising an identity of a Bluetooth device to the host at boot.

The disclosure is also directed to a system for providing a host with a Bluetooth transceiver, comprising a Bluetooth transceiver, a modified OHCI and a PCI/PCIe bus, wherein the Bluetooth transceiver is configured to send a status signal when there is data to be transferred to the host and is connected by the modified OHCI to the PCI/PCIe bus and wherein the modified OHCI comprises a list processor, controls a virtual USB connection between the Bluetooth transceiver and the PCI/PCIe bus, is configured to activate the list processor upon receipt of the status signal, such that the list processor controls the transfer of the data to be transferred to the host; and is configured to inactivate the list processor after delivery of the data to be transferred to the host.

As noted above, the modified OHCI is configured to be compatible with standard USB software resident on the host, a Microsoft Windows Bluetooth stack or the USB 1.1 protocol.

In one embodiment of the system, the host also includes a WLAN transceiver wherein the WLAN transceiver is connected the PCI/PCIe bus. Preferably, the WLAN transceiver is integrated onto the same chip as the Bluetooth transceiver.

In another aspect of the disclosure, the data to be transferred to the host is bulk IN data and/or interrupt IN data.

Another embodiment in which the host has a CPU and main memory involves the modified OHCI not interacting with the CPU and the main memory regarding bulk and interrupt IN transfers until the Bluetooth transceiver sends the status signal.

Yet another embodiment is directed to the modified OHCI being configured to advertise an identity of a Bluetooth device to the host at boot.

BRIEF DESCRIPTION OF THE DRAWINGS

Further features and advantages will become apparent from the following and more particular description of the preferred embodiments of the invention, as illustrated in the accompanying thawing, and in which like referenced characters generally refer to the same parts or elements throughout the views, and in which.

DETAILED DESCRIPTION OF THE INVENTION

Figure 1:
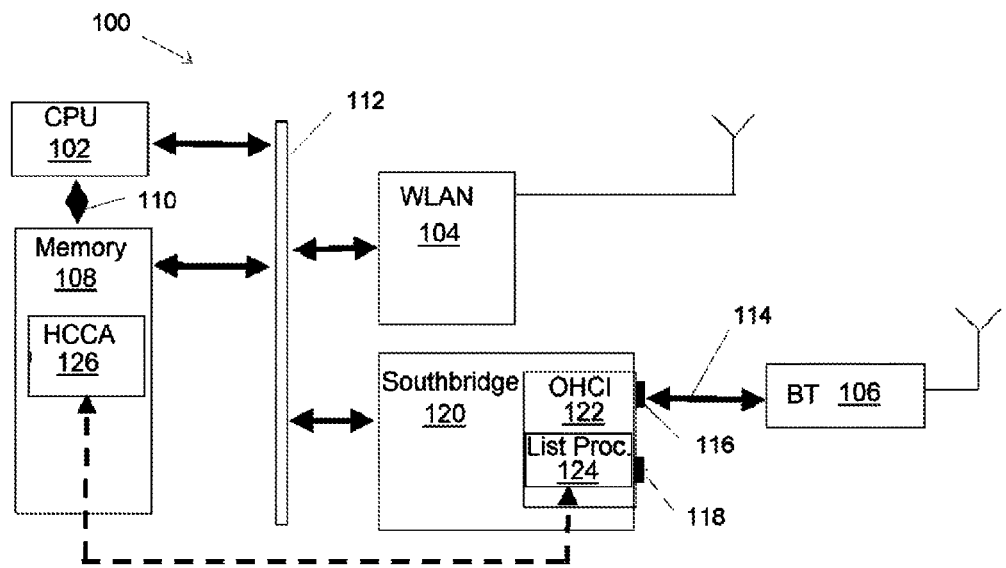
FIG. 1 is a schematic diagram of a conventional computing device with a WLAN module and a Bluetooth module connected via a PCI/PCIe inter face.

This disclosure involves methods and systems for providing a host with a Bluetooth transceiver by way of a virtual USB connection to a PCI/PCIe bus in which the virtual USB connection is controlled by a modified OHCI. The Bluetooth transceiver is configured to send a status signal when there is data to be transferred to the host. The modified OHCI is configured to activate a list processor upon receipt of the status signal, so that the list processor mediates the transfer of the data to be transferred to the host. After delivery of the data to the host, the modified OHCI is configured to inactivate the list processor. Further, the modified OHCI is configured to be compatible with standard USB software resident on the host. Employing the techniques of this disclosure offers a number of benefits, including enabling a single chip solution for WLAN and Bluetooth communications, simplifying design through the use of a single, common bus, and delivering considerable power efficiency with respect to conventional USB Bluetooth implementations.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary transmission and receiving stations may include components other than those shown, including well-known components such as a processor and memory and perhaps audio and visual components.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

Figure 2:
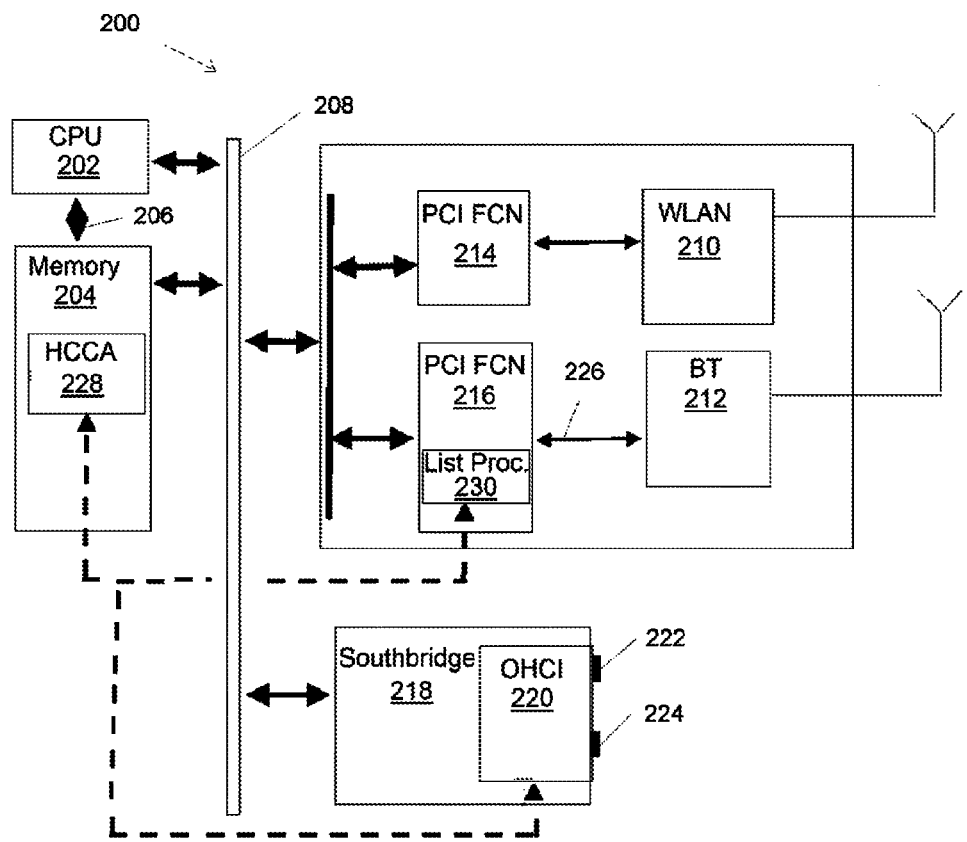
FIG. 2 is a schematic diagram of a host computing device with an integrated WLAN subsystem and Bluetooth subsystem employing a virtual USB interface connected via a PCI/PCIe interface, according to the invention.

Turning now to FIG. 2, host computing device 200 is represented as schematic diagram featuring the functional components relevant to this disclosure. CPU 202 is connected to main memory 204 by front side bus 206 and communicates with mainboard components through PCI/PCIe bus 208. Wireless communication services are provided by WLAN subsystem 210 and Bluetooth subsystem 212, which are connected through bus 208. As will be appreciated, WLAN subsystem 210 and Bluetooth subsystem 212 include the respective baseband portions and other physical (PHY) layer hardware. Preferably, WLAN subsystem 210 and Bluetooth subsystem 212 are integrated into a single chip.

As shown, WLAN subsystem 210 is connected to bus 208 by a first PCI function 214 while Bluetooth subsystem 212 is connected via a second PCI function 216. As will be described in detail below, PCI function 216 is incorporated into a modified OHCI. Finally, in the embodiment shown, southbridge controller 218 provides USB functionality through OHCI 220 driving USB ports 222 and 224. As shown, Bluetooth subsystem 212 does not require connection through southbridge 218 and leaves USB ports 222 and 224 available for use by other USB devices. Alternatively, in other embodiments, southbridge 218 can be omitted, representing corresponding reductions in size, complexity and expense.

In lieu of the type of conventional USB connection discussed above, PCI function 216 comprises a modified OHCI that provides a virtual USB connection 226 to Bluetooth subsystem 212. In combo chip embodiments, the virtual USB connection 226 is part of the chip architecture. Since the modified OHCI connects only to Bluetooth subsystem 212 via virtual USB connection 226 and is not required to control any actual USB devices, it can be configured to interact with the HCCA 228 location in main memory in a transparent manner, appearing to mimic a conventional OHCI. As such, the modified OHCI can be fully compatible with standard USB software, including the Windows Bluetooth stack, despite being connected through the bus 208.

In one alternate embodiment, the Bluetooth module is physically separate. This allows the use of any suitable virtual USB connection, including a standard USB plug and port combination. For example, the USB can be implemented as a hub with a downstream USB PHY layer providing the USB bus connection to the Bluetooth module. Although this implementation does not offer the power saving advantages, it does save the use of a USB port, which can be beneficial given the often limited number of ports available.

The modified OHCI generally includes the host controller (HC), PCI function 216 in the embodiment shown, and a software component, the host controller driver (HCD). Thus, the modified OHCI communicates with HCCA 228 to coordinate data transfers to Bluetooth subsystem 212 in a manner analogous to conventional USB protocols. Specifically, data being communicated to the Bluetooth subsystem is organized using Endpoint Descriptors (ED) and Transfer Descriptors (TD). As known to those of skill in the art, the ED contains the information necessary for the HC to communicate with the endpoint stored in main memory 204. The Host Controller Driver assigns an ED to each endpoint in the system and the EDs are linked together in a list. Likewise, a queue of IDs describing the data for with each endpoint are associated with each ED. List processor 230 sequentially handles the ED list.

To match the functionality of the standard OHCI and preserve compatibility with standard USB software, the modified OHCI mediates the transfer for four data types. Interrupt transfers are relatively small, periodic data transfers used to communicate information from the Bluetooth subsystem 212 to the client software running in main memory 204. Control transfers are nonperiodic data transfers used to communicate configuration/command/status type information between the client software and Bluetooth subsystem 212. Isochronous transfers are periodic data transfers with guaranteed latencies, primarily used for moving time sensitive data, such as video streams or A2DP audio streams associated with the use of a Bluetooth headset, for example. Finally, bulk transfers are nonperiodic data transfers that do not require the guaranteed latencies characteristic of isochronous transfers. An important bulk transfer category is the data transferred by a HID, such as a keyboard, mouse or graphics pad.

Data transfer for each type is implemented using queues and linked lists, as known to those of skill in the art. Head pointers to the bulk and control ED lists are generally maintained within the operational registers in the HC. Head pointers to the interrupt ED lists are maintained within the HCCA. Finally, isochronous transfer EDs are linked to the last interrupt ED and do not require a separate head pointer. The HCD enques and dequeues the EDs. A transfer is enqueued by adding the ED to the tail of the respective list. When all of the data defined by a ID for a given ED has been transferred, the ID is unlinked from its ED and linked to the done queue. The HCD then processes the done queue and distributes the relevant completion information.

A conventional OHCI coordinates these transfers through the issuance of respective tokens. Interrupt and isochronous tokens are issued at a given periodicity to obtain the desired functionality while control and bulk tokens are issued when the HC is not otherwise occupied. Attached USB devices can respond to OHCI polling by indicating there is data pending for a transfer only when they receive the appropriate token.

Relatively few control transfers are necessary for the operation of a typical USB device, but there is always the possibility that the USB device has a bulk transfer pending. As such, a conventional OHCI constantly issues bulk IN tokens whenever another transfer is not taking place or the interface is not otherwise occupied. However, there is no guarantee that the USB device has any pending bulk IN data to transfer. For example, a HID such as a keyboard or mouse has a bulk transfer when it receives user input, but there can be relatively large periods of time between inputs. In a keyboard, there are obvious limits to the speed of a user typing or with a mouse, there is transfer only when the user is actively pointing or clicking. When no bulk transfer is pending, the USB device simply returns a negative acknowledgement (NAK) token in response to the bulk IN token. As will be appreciated, this results in a situation where the USB bus is filled for relatively large periods of time with strings of bulk IN tokens followed by a returned NAK token from the USB device, a condition known as NAK flooding.

In a desktop environment, the consequences of NAK flooding resulting from this USB polling architecture are relatively minor. However, in a mobile environment, the polling overhead represents a significant power inefficiency. As will be appreciated, in addition to the bus activity, continually polling a bulk IN endpoint prevents the CPU, memory, and other components of the system from entering any conservation state, forgoing any power savings that might be possible by letting portions of the computing device go dormant. Thus, significant power consumption is present, even when there is no data actually being transferred. Since power is a fundamentally scarce resource in mobile environments, efficiency is a critical design consideration.

Therefore, the modified OHCI of this disclosure is preferably configured to minimize or even eliminate NAK flooding, particularly with regard to bulk IN and interrupt IN transfers. Since isochronous transfers require specific timings to guarantee latency, the modified OHCI preferably handles such transfers in the same manner as a conventional OHCI. Furthermore, since control transfers are infrequent, these transfers are also preferably handled conventionally. On the other hand, interrupt IN transfers and, especially, bulk IN transfers, represent significant potential power savings.

The techniques of this disclosure exploit the fact the modified OHCI is responsible only for coordinating with Bluetooth subsystem 212 and can therefore be supplemented with the ability to receive a status signal from the Bluetooth subsystem. Rather than continuously polling for bulk and interrupt IN transfers, the modified OHCI maintains list processor 230 in an inactive state by default. Bluetooth subsystem 212 is configured to generate a signal as soon as a bulk or interrupt data transfer is pending. Upon receiving this signal, the modified OHCI then activates list processor 230, so that data transfer can then be accomplished by following standard USB techniques. Namely, modified OHCI now issues an IN token and since a transfer is pending, Bluetooth subsystem 212 responds with an acknowledgement token (ACK) and the data packets necessary to complete the transfer. Upon receipt of the ACK token, list processor 230 services the ED corresponding to the data to be transferred. Upon completion of the transfer, list processor 230 updates the done queue in HCCA and the modified OHCI then deactivates list processor 230, assuming no other transfers have queued in the interim. As will be appreciated, the modified OHCI need not constantly poll the Bluetooth subsystem to query for bulk or interrupt transfers, resulting in a significant gain in power efficiency.

Although aspects of this disclosure have focused on the power savings associated for providing Bluetooth communication using a virtual USB connection driven by the modified OHCI for use with a HID, similar efficiencies can be realized with other Bluetooth devices. For example, implementing file transfer protocol (FTP) over a standard USB-connected Bluetooth also can result in NAK flooding. Bluetooth-connected printers, virtual serial ports and Bluetooth network encapsulation protocol (BNEP) networks can also be optimized using these techniques. Indeed, this disclosure is relevant to virtually any device transferring access control list (ACL) data.

In addition to power savings and the other benefits described above, one of skill in the art will recognize that a number of other advantages flow from the use of a modified OHCI to drive a virtual USB port to provide Bluetooth communications. A primary example is that the modified OHCI can be designed solely to optimize performance in the context of communicating with Bluetooth subsystem 212 over virtual USB connection 226. The modified OHCI does not need to accommodate all possible USB devices, or indeed any physical USB device at all. For example, the state machine of list processor 230 can be significantly clocked down and employ very aggressive clock gating. As one having skill in the art will recognize, implementing the virtual USB bus as a completely on-chip solution, a substantial amount of the PHY level processing and bus connect/disconnect logic can be omitted.

In a preferred embodiment, the modified OHCI emulates an OHCI associated with the USB 1.1 standard, such as OHCI ver 1.0a. This minimizes the size of the OHCI as it is not necessary to recreate the functionality of USB 2.0 or 3.0 protocols for this application. It is worth noting that the modified OHCI need not share the speed limitations of the USB 1.1 standard and may be as fast as permitted given the chip architecture in which virtual USB connection 226 is implemented.

Another benefit is that the modified OHCI can be extended to provide other functions. For example, the modified OHCI can advertise on boot, allowing the use of a Bluetooth HID virtually instantaneously, rather than waiting for the Windows Bluetooth stack to load along with the operating system and for the conventional USB enumeration process to occur.

Further, in addition to the power savings associated with reducing the polling associated with bulk and interrupt transfers, the virtual USB 226 connection represents other inherent efficiencies. For example, the need for a PHY layer is bypassed, which obviates the need for the normally required phase locked loop (PLL). In addition, the USB PHY is typically analog, which is subject to power leakage and, correspondingly, this loss is also avoided.

Described herein are presently preferred embodiments, however, one skilled in the art that pertains to the present invention will understand that the principles of this disclosure can be extended easily with appropriate modifications to other applications. Although the disclosed embodiments are tailored to providing a virtual USB connection to a Bluetooth subsystem, a modified OHCI could be configured for essentially any USB device, allowing that device to interface over the PCI/PCIe and obtain the benefits of this disclosure. One of skill in the art will also recognize that the techniques could be extended and adapted as necessary to accommodate other systems and standards.

What is claimed is:

1. A method for providing a host with Bluetooth communications capabilities, comprising:
sending a status signal from a Bluetooth transceiver to a modified open host controller interface (OHCI) when there is data to be transferred to the host, wherein the modified OHCI is coupled to the host via a PCI/PCIe bus;
activating a list processor in the modified OHCI when the modified OHCI receives the status signal from the Bluetooth transceiver;
transferring the data to be delivered to the host using the list processor; and
inactivating the list processor when the data has been delivered to the host.

2. The method of claim 1, wherein the modified OHCI is configured to mediate data transfers between the host and the Bluetooth transceiver.

3. The method of claim 1, wherein the modified OHCI is configured to be compatible with a Microsoft Windows Bluetooth stack.

4. The method of claim 1, wherein the modified OHCI is configured to be compatible with a universal serial bus (USB) 1.1 protocol.

5. The method of claim 1, further comprising providing wireless local area network (WLAN) communications with a WLAN transceiver coupled to the PCI/PCIe bus.

6. The method of claim 5, further comprising integrating the WLAN transceiver and the Bluetooth transceiver onto a single integrated circuit.

7. The method of claim 1, wherein transferring the data comprises transferring bulk IN data.

8. The method of claim 1, wherein transferring the data further comprises transferring interrupt IN data.

9. The method of claim 1, wherein the host comprises a central processing unit (CPU) and main memory, further comprising allowing interaction between the modified OHCI, the CPU and the main memory regarding bulk and interrupt IN transfers after the Bluetooth transceiver sends the status signal.

10. The method of claim 1, further comprising the modified OHCI advertising an identity of a Bluetooth device to the host at boot.

11. A system for providing a host with Bluetooth communications capabilities, comprising:
a Bluetooth transceiver configured to send a status signal when there is data to be transferred to the host;
a modified open host controller interface (OHCI) comprising a list processor; and
a PCI/PCIe bus coupled to the Bluetooth transceiver via the modified OHCI;
wherein the modified OHCI is configured to:
control a virtual USB connection between the Bluetooth transceiver and the PCI/PCIe bus;
activate the list processor upon receipt of the status signal, such that the list processor controls the transfer of the data to be transferred to the host; and
inactivate the list processor after delivery of the data to be transferred to the host.

12. The system of claim 11, wherein the modified OHCI is configured to mediate data transfers between the host and the Bluetooth transceiver.

13. The system of claim 11, wherein the modified OHCI is configured to be compatible with a Microsoft Windows Bluetooth stack.

14. The system of claim 11, wherein the modified OHCI is configured to be compatible with a universal serial bus (USB) 1.1 protocol.

15. The system of claim 11, further comprising a wireless local area network (WLAN) transceiver wherein the WLAN transceiver is coupled the PCI/PCIe bus.

16. The system of claim 15, wherein the WLAN transceiver and the Bluetooth transceiver are integrated onto the same integrated circuit.

17. The system of claim 11, wherein the data to be transferred to the host comprises bulk IN data.

18. The system of claim 11, wherein the data to be transferred to the host further comprises interrupt IN data.

19. The system of claim 11, wherein the host comprises a central processing unit (CPU) and main memory, and the modified OHCI does not interact with the CPU and the main memory regarding bulk and interrupt IN transfers until the Bluetooth transceiver sends the status signal.

20. The system of claim 11, wherein the modified OHCI is configured to advertise an identity of a Bluetooth device to the host at boot.

21. A modified open host controller interface (OHCI) comprising a list processor, wherein the modified OHCI is configured to:
activate the list processor when the modified OHCI receives a status signal sent by a Bluetooth transceiver when there is data to be transferred from the Bluetooth transceiver to a host;
transfer the data to the host using the list processor; and
inactivate the list processor after the data has been delivered to the host.

22. The modified OHCI of claim 21, wherein the modified OHCI is configured to mediate data transfers between the host and the Bluetooth transceiver.

23. The system of claim 21, wherein the modified OHCI is configured to be compatible with a Microsoft Windows Bluetooth stack.

24. The system of claim 21, wherein the modified OHCI is configured to be compatible with a universal serial bus (USB) 1.1 protocol.

* * * * *